United States Patent
Lee et al.

(10) Patent No.: US 6,736,351 B2
(45) Date of Patent: May 18, 2004

(54) TAPE GUIDE DEVICE FOR MAGNETIC RECORDING/REPRODUCING APPARATUS

(75) Inventors: Seung-woo Lee, Suwon (KR); Bong-joo Kim, Suwon (KR); Do-young Choi, Suwon (KR); Jae-hoon Sim, Suwon (KR); Young-ho Cho, Suwon (KR); Jeong-hyeob Oh, Anyang (KR); Hyeong-seok Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/271,970

(22) Filed: Oct. 17, 2002

(65) Prior Publication Data

US 2003/0132340 A1 Jul. 17, 2003

(30) Foreign Application Priority Data

Jan. 17, 2002 (KR) .......................... 2002-2800

(51) Int. Cl.⁷ .............................. B65H 23/32
(52) U.S. Cl. .............. 242/615.21; 242/346.2; 242/615.2; 360/95
(58) Field of Search ............ 226/19, 179, 190; 360/95; 242/615.21, 346.1, 346.2, 615.2, 615.3

(56) References Cited

U.S. PATENT DOCUMENTS

| | | | | |
|---|---|---|---|---|
| 3,276,651 A | * | 10/1966 | Bryer | 242/615.2 |
| 3,661,311 A | * | 5/1972 | Warren | 242/615.21 |
| 4,040,575 A | * | 8/1977 | Ryan | 242/615.2 |
| 5,395,067 A | * | 3/1995 | Kano et al. | 242/344 |
| 5,407,117 A | * | 4/1995 | Yokoo et al. | 226/190 |
| 5,546,259 A | * | 8/1996 | Iwata et al. | 360/130.22 |
| 5,769,356 A | * | 6/1998 | Yoo | 242/615 |
| 5,784,229 A | * | 7/1998 | Hashi et al. | 360/130.21 |
| 6,160,675 A | * | 12/2000 | Shudo et al. | 360/72.3 |

FOREIGN PATENT DOCUMENTS

JP 05166261 A * 7/1993

* cited by examiner

*Primary Examiner*—Emmanuel Marcelo
(74) *Attorney, Agent, or Firm*—Staas & Halsey LLP

(57) ABSTRACT

A tape guide device for a magnetic recording/reproducing apparatus includes a pole base assembly to guide a tape supplied from a supply reel and passed through a predetermined path to be moved horizontally to a read surface of a head drum. The pole base assembly includes a pole base installed adjacently to or separately from one side of the head drum during a loading/unloading operation of the tape. The pole base assembly also includes a pole unit including a spiral flange inclined to the pole base to be in a horizontal direction to the read surface of the head drum, to guide the tape entering the head drum to be inclined at a predetermined angle and positioned in the horizontal direction to the read surface.

10 Claims, 5 Drawing Sheets

(PRIOR ART)

(PRIOR ART)

TAPE GUIDE DEVICE FOR MAGNETIC
RECORDING/REPRODUCING APPARATUS

CROSS-REFERENCE TO RELATED
APPLICATIONS

This application claims the benefit of Korean Application No. 2002-2800, filed Jan. 17, 2002, in the Korean Industrial Property Office, the disclosure of which is incorporated herein by reference.

BACKGROUND OF THE INVENTION

1. Field of the Invention

The present invention relates to a magnetic recording/reproducing apparatus, and more particularly, to a tape guide device for a magnetic recording/reproducing apparatus which guides a tape released from a cassette tape recorder and loaded to contact a head drum.

2. Description of the Related Art

In general, a magnetic recording/reproducing apparatus, such as a video cassette tape recorder and a camcorder, records information on a recording medium such as a magnetic tape, and reproduces the recorded information.

The magnetic recording/reproducing apparatus includes a main deck on which a head drum is rotatably installed, a main sliding member positioned on the main deck to be slid in a right/left direction, a sub deck disposed at the main deck to be slid in an upper/lower direction, a transferring unit to transfer a cassette tape mounted on the sub deck to a predetermined position of the main deck and a reel table on which two tape reels of the cassette tape are positioned, and which is driven to wind one of the tape reels. The head drum rotatably installed on the main deck is used to record/reproduce information on the tape. The magnetic recording/reproducing apparatus also includes a tape loading unit to load the tape into the head drum, and a tape guide device.

FIG. 1 is a schematic plan view illustrating a conventional tape guide device for a magnetic recording/reproducing apparatus. The conventional tape guide device includes an entrance side pole base unit 20 and an exit side pole base unit 30 to guide a tape T at both sides of a head drum 10 so that the tape T surrounds the head drum 10. The conventional tape guide also includes a plurality of guide posts 41, 42, 43 and 44. The guide posts 42 and 43 are fixed on a main deck 1, and the other guide posts 41 and 44 are moved on the main deck 1 to guide the tape T and to adjust tension.

Each of the pole base units 20 and 30 is transferred in an upper/lower direction A of the main deck 1 by a transferring unit to guide the tape T. Since the head drum 10 is inclined on the main deck 1 at a predetermined angle, the pole base units 20 and 30 are structured to guide the tape T to be inclined on the head drum 10 at a predetermined angle.

FIG. 2 is a schematic partial perspective view of FIG. 1. Referring to FIG. 2, the entrance side pole base unit 20 includes a pole base 21, a rotation support roller 23, and a fixed post 25. The rotation support roller 23 is installed on the pole base 21 to be moved in an upper/lower direction. Accordingly, a movement position of the tape T is controlled by adjusting a position of the rotation support roller 23 in the upper/lower direction. Since the head drum 10 is inclined, the fixed post 25 is inclined to the rotation support roller 23 at a predetermined angle between the rotation support roller 23 and the head drum 10, thereby maintaining the tape T parallel.

However, the conventional tape guide device needs the rotation support roller 23 and the fixed post 25 to maintain the tape parallel and adjust the upper/lower position of the tape, thereby increasing component parts for the tape guide and cost of the tape guide. Moreover, the components may easily contact and damage the tape.

SUMMARY OF THE INVENTION

Accordingly, it is an object of the present invention to provide a tape guide device for a magnetic recording/reproducing apparatus which decreases a number of components and simplifies a whole structure of the tape guide.

Additional objects and advantages of the invention will be set forth in part in the description which follows and, in part, will be obvious from the description, or may be learned by practice of the invention.

The foregoing and other objects of the present invention are achieved by providing a tape guide device for a magnetic recording/reproducing apparatus, including a pole base assembly to guide a tape supplied from a supply reel and passed through a predetermined path to be moved horizontally to a read surface of a head drum. The pole base assembly includes a pole base installed adjacently to or separately from one side of the head drum during a loading/unloading operation of the tape. The pole base assembly also includes a pole unit including a spiral flange inclined to the pole base in a horizontal direction to the read surface of the head drum, to guide the tape entering the head drum to be inclined at a predetermined angle and positioned in the horizontal direction to the read surface.

According to an aspect of the invention, the pole unit includes a guide pole installed on the pole base, and a flange member having the spiral flange and being installed at an upper end of the guide pole.

According to an aspect of the invention, the guide pole includes a fixed post being fixed to the pole base, and having a first fastening unit of a predetermined length at its upper end. The guide pole also includes a coil spring inserted into a lower end of the fixed post, a flange type ring movably supported by the fixed post to be positioned on the coil spring, and a cylindrical guide pipe inserted into the fixed post to have a smaller outer diameter than the ring, to support the flange member at its upper end. The guide pole includes a movable post having a second fastening unit fastened to the first fastening unit of the fixed post through the upper opened end of the guide pipe, to prevent separation of the guide pipe and the flange unit. A height of the ring, the guide pipe, the flange member and the movable post are controlled in an upper/lower direction according to a fastening state of the movable post and the fixed post.

According to another aspect of the invention, of the first and second fastening units is a bolt and the other one is a nut, thus tightened by mutual rotation.

According to an aspect of the invention, a third fastening unit having a reduced outer diameter is disposed at the upper end of the guide pipe so that the flange member is inserted thereinto.

According to yet another aspect of the invention, the tape guide device further includes a physical position fixing unit to constantly maintain a right/left position of the flange member when the flange member is moved in the upper/lower direction with the guide pipe.

According to an aspect of the invention, the physical position fixing unit includes a fixed pin protruding from the pole base at a predetermined height in a line with the guide pole, and a guide slit unit disposed at a lower end of the flange member to guide an upper/lower movement of the flange member and to restrict a right/left movement thereof by using the fixed pin.

BRIEF DESCRIPTION OF THE DRAWINGS

The above and other objects and advantages of the invention will become apparent and more appreciated from the following description of the preferred embodiments, taken in conjunction with the accompanying drawings of which.

DETAILED DESCRIPTION OF THE PREFERRED EMBODIMENT

Figure 1:
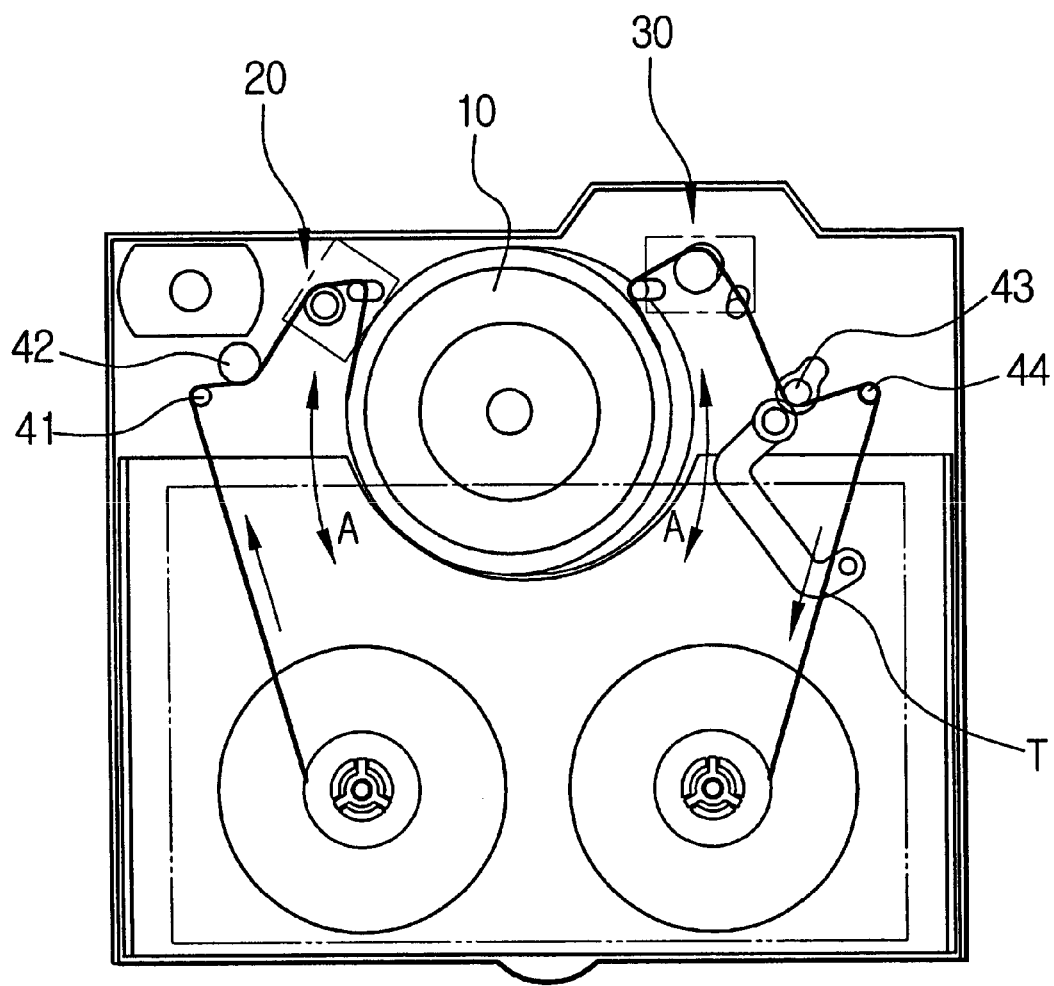
FIG. 1 is a schematic plan view illustrating a conventional tape guide device for a magnetic recording/reproducing apparatus.
Figure 2:
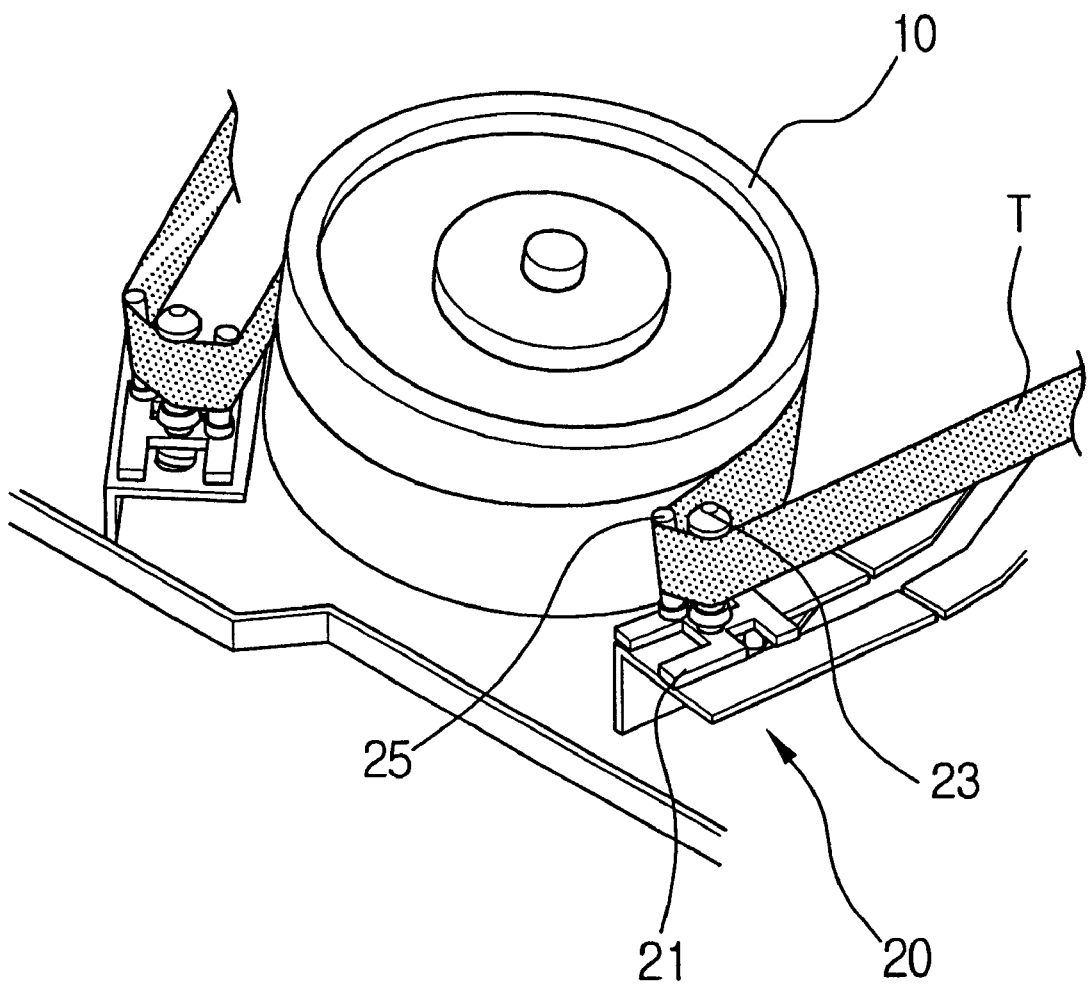
FIG. 2 is a schematic partial perspective view illustrating major components of FIG. 1.

Reference will now be made in detail to the present preferred embodiment of the present invention, examples of which are illustrated in the accompanying drawings, wherein like reference numerals refer to like elements throughout.

Figure 3:
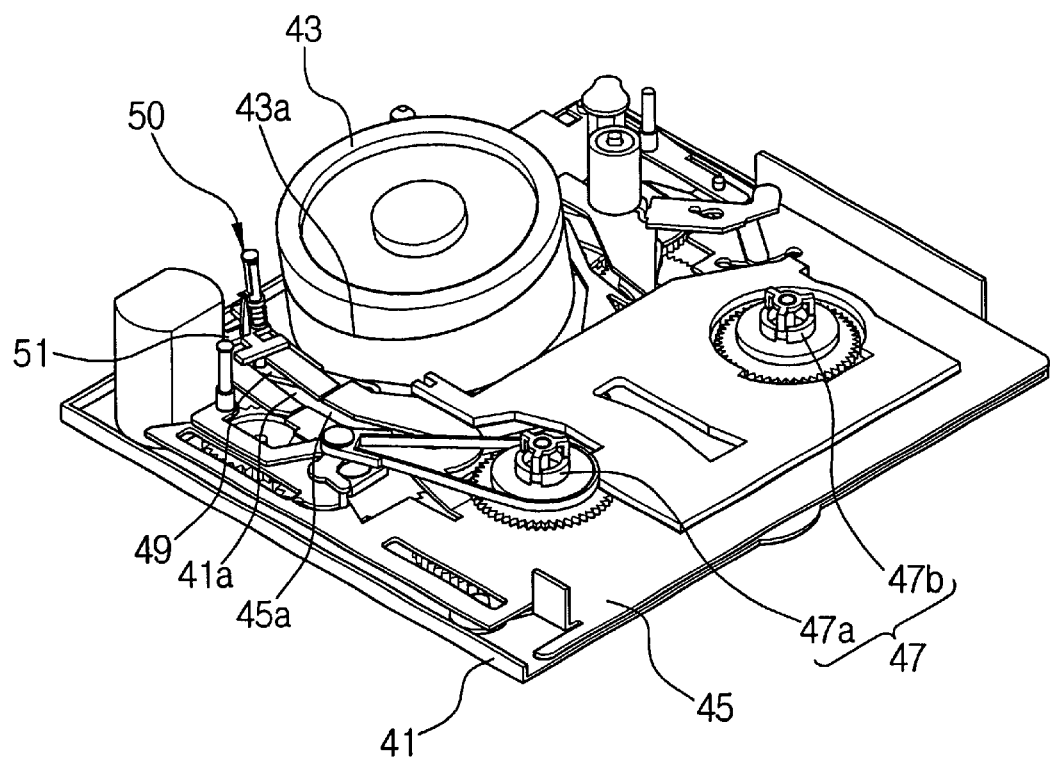
FIG. 3 is a schematic perspective view illustrating a magnetic recording/reproducing apparatus using a tape guide device, according to an embodiment of the present invention.

FIG. 3 is a schematic perspective view illustrating the magnetic recording/reproducing apparatus using a tape guide device, according to an embodiment of the present invention. As illustrated in FIG. 3, a head drum 43 is rotatably installed on a main deck 41. The head drum 43 is inclined on the main deck 41 at a predetermined angle, and rotated to record information on a tape T or to reproduce the recorded information. A sub deck 45 is slid on the main deck 41 by a predetermined distance to be loaded or unloaded to/from a side of the head drum 43.

A reel table 47 to drive a cassette tape is disposed at the sub deck 45. The reel table 47 includes a supply reel side table 47a and a winding reel side table 47b. The tape guide device guides the tape supplied from the supply reel side table 47a and passed through a predetermined path to be moved horizontally to a read surface 43a of the head drum 43. The tape guide device includes a pole base assembly 50 moved along guide rails 41a and 45a connected respectively to the main deck 41 and the sub deck 45 to guide the tape.

The pole base assembly 50 includes a pole base 51 installed to be movable on the guide rails 41a and 45a, and a pole unit 53 inclined on the pole base 51 at a predetermined angle, to guide the tape to be in a horizontal direction to the read surface 43a of the head drum 43. The pole base 51 is adjacent to or separated from a left side of the head drum 43 by a link member 49 linked to the sub deck 45 during the loading/unloading operation of the sub deck 45. Here, the pole base 51 is made of a plastic material.

Figure 4:
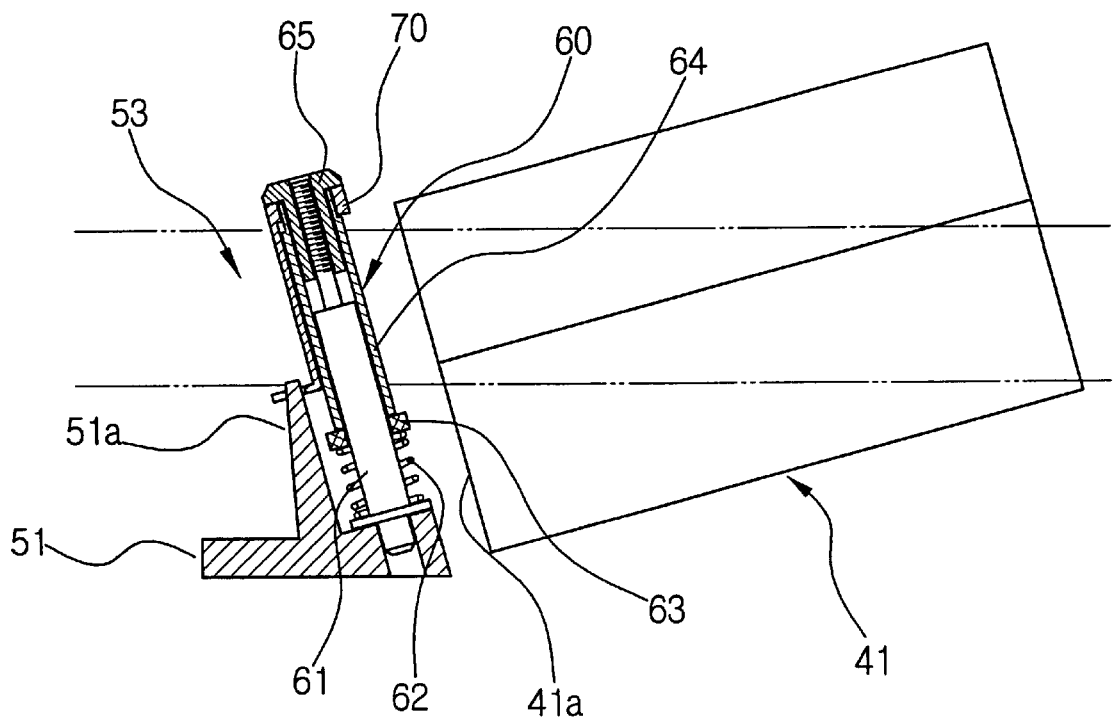
FIG. 4 is a cross-sectional view illustrating the tape guide device of FIG. 3.

As illustrated in FIG. 4, the pole unit 53 includes a guide pole 60 installed on the pole base 51, and a flange member 70 installed at an upper end of the guide pole 60. The guide pole 60 is inclined at a predetermined angle to be positioned in the horizontal direction to the read surface 43a of the head drum 43. The guide pole 60 includes a fixed post 61 fixed to the pole base 51, a coil spring 62, a flange type ring 63 and a guide pipe 64 which are sequentially connected to the fixed post 61. The guide pole 60 also includes a cap member 65 connected to an uppermost end of the fixed post 61.

Figure 5:
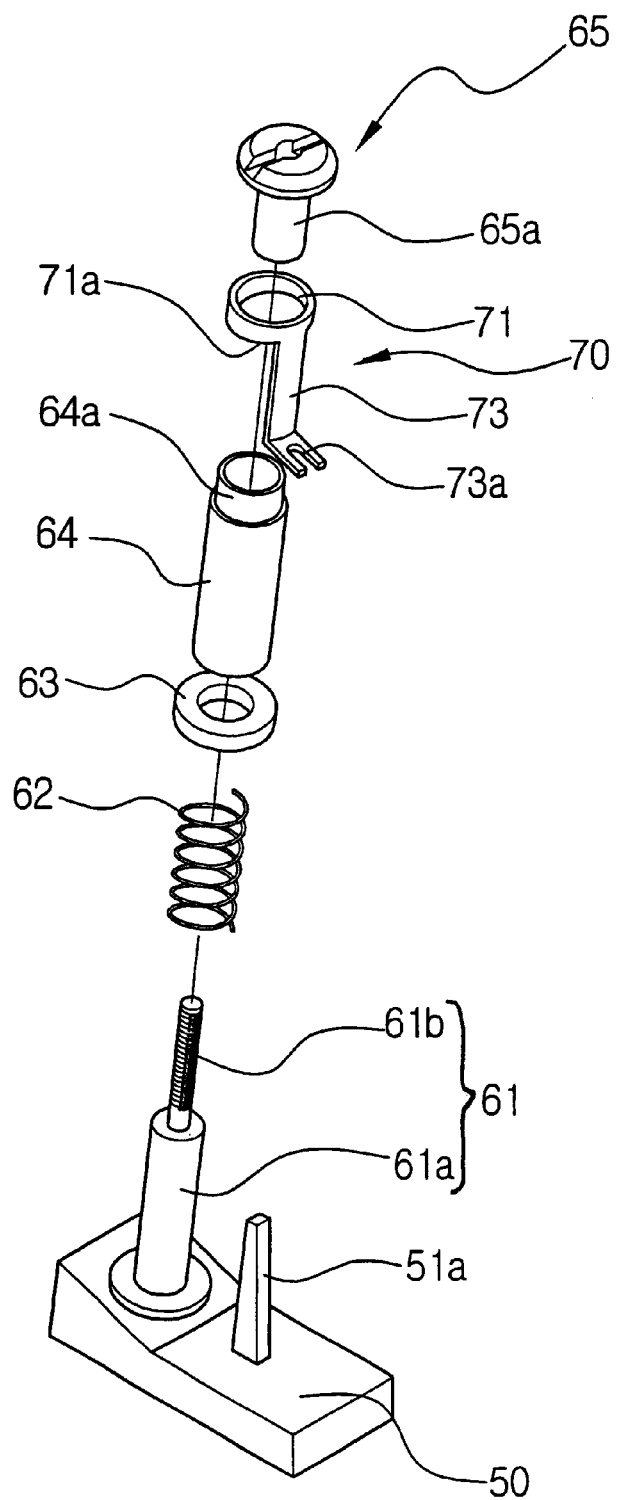
FIG. 5 is a perspective view illustrating a disassembly state of the tape guide device of FIG. 4.

As illustrated in FIG. 5, the fixed post 61 has a cylindrical body 61a, and is inclined to the pole base 51 at a predetermined angle. A bolt-type first fastening unit 61b is formed at an upper end of the body 61a of the fixed post 61 at a predetermined length. The first fastening unit 61b has a smaller outer diameter than the body 61a. The coil spring 62 is inserted into a lower end of the fixed post 61. The flange type ring 63 is connected to the body 61a of the fixed post 61 to be positioned on the coil spring 62. The guide pipe 64 is movably inserted into the fixed post 61 to be positioned on the flange type ring 63. The guide pipe 64 has a smaller outer diameter than the flange type ring 63. A fastening unit 64a having a reduced outer diameter to support the flange member 70 is installed at an upper end of the guide pipe 64 with a predetermined width.

As described above, the coil spring 62, the ring 63 and the pipe 64 are sequentially inserted into the fixed post 61. In addition, the flange member 70 is inserted into the fastening unit 64a of the guide pipe 64.

The flange member 70 includes a spiral flange 71 inserted into the fastening unit 64a, and a guide slit unit 73 extended from one side of the spiral flange 71 to a lower end thereof by a predetermined distance. The spiral flange 71 serves as an upper/lower flange of the guide pipe 64 with the ring 63, and contacts and guides an edge of the tape. Since the head drum 43 is inclined, a spiral inclined surface 71a to guide the tape to enter the read surface 43a of the head drum 43 in the horizontal direction is formed on the spiral flange 71 at a predetermined length. A fixed pin 51 a which will be explained later, is inserted into the lower end of the guide slit unit 73, to form a guide slit 73a to maintain a constant physical position during a movement of the flange member 70.

The cap member 65 is connected to the fixed post 61 through the upper opened end of the guide pipe 64. The cap member 65 includes a second fastening unit 65a screwed to the first fastening unit 61 b of the fixed post 61. The second fastening unit 65a is a nut with an internal thread. The cap member 65 prevents the guide pipe 64 and the flange member 70 from being separated from the fixed post 61, and adjusts a height thereof. That is, the ring 63 and the pipe 64 are assembled with pressure of the coil spring 62. The height of the ring 63 and the pipe 64 is adjusted by compressing the coil spring 62 according to a fastening state of the cap member 65. Preferably, a nut hole is formed at an upper end of the cap member 65 to obtain a sufficient height adjusting margin of the pipe 64.

Accordingly, the height of the pipe 64 is adjusted by rotating the cap member 65. The pipe 64 is rotated with the cap member 65. Thus, the tape guide device further includes a physical position fixing unit to prevent resulting rotation of the flange member 70, and to guide the physical position during the height adjustment of the pipe 64.

The physical position fixing unit includes a fixed pin 51 a protruding from the pole base 51 at a predetermined height, and a guide slit unit 73 disposed at the lower end of the flange member 70. The guide pin 51a is positioned in a line with the guide pole 60 at a predetermined length, and preferably incorporated with the pole base 51. When the guide pin 51 a is inserted into the guide slit 73a of the guide slit 73, the flange member 70 is not rotated in the right/left direction, but a height thereof is adjusted in the upper/lower direction. Therefore, the spiral inclined surface 71 a of the flange member 70 has a predetermined angle from the head drum 43.

Figure 6:
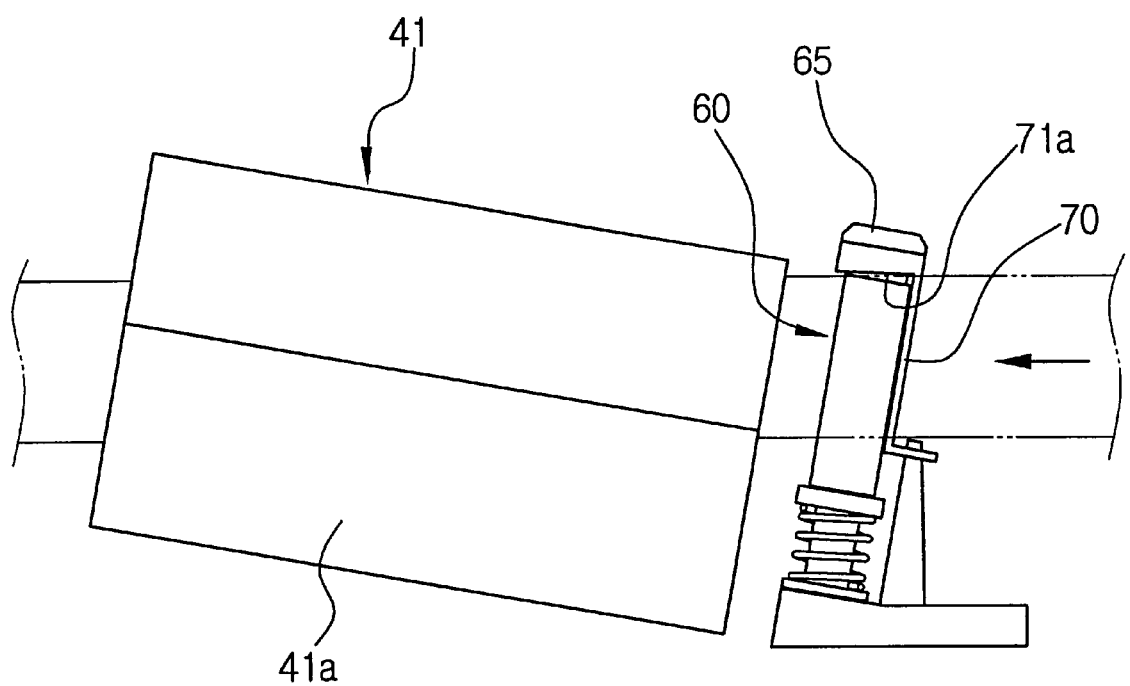
FIG. 6 is a schematic view illustrating an operation of the tape guide device.

In accordance with the present invention, the guide pole 60 is installed on the pole base 51, and the flange member 70 having the spiral flange 71 is installed at the upper end of the guide pole 60, thereby guiding the tape to be moved in the horizontal direction to the read surface 43a of the head drum 43 by using the one guide pole 60. As illustrated in FIG. 6, the tape T supplied from the supply reel side table 47a is guided to the read surface 43a of the head drum 43 by the guide pole 60. The tape T is guided by the spiral inclined surface 71 a of the flange member 70 horizontally to the read surface 43a of the head drum 43. In regard to a movement height of the tape T, the height of the guide pole 60 is adjusted by rotating the cap member 65 at a predetermined angle.

As described above, the tape guide device for the magnetic recording/reproducing apparatus guides the tape to the entrance of the head drum in the horizontal direction by using one guide pole instead of using a general tape guide roller. As a result, expenses for the tape guide device are cut down considerably due to a reduced number of components. Further, the tape may be protected by decreasing a contact area of the tape and the tape guide device.

Although a preferred embodiment of the present invention have been shown and described, it would be appreciated by those skilled in the art that changes may be made in the embodiment without departing from the principles and spirit of the invention, the scope of which is defined in the claims and their equivalents.

What is claimed is:

1. A tape guide device for a magnetic recording/reproducing apparatus, comprising:
   a pole base assembly to guide a tape supplied from a supply reel and passed through a predetermined path to be moved parallel to a read surface of a head drum, wherein the pole base assembly comprises:
   a pole base installed adjacently to or separately from one side of the head drum during a loading/unloading operation of the tape; and
   a pole unit including a spiral flange inclined to the pole base in a direction parallel to the read surface of the head drum, to guide the tape entering the head drum to be inclined at a predetermined angle and positioned in the parallel direction to the read surface.

2. The device according to claim 1, wherein the pole unit comprises:
   a guide pole installed on the pole base; and
   a flange member having the spiral flange and being installed at an end of the guide pole.

3. The device according to claim 2, wherein the guide pole comprises:
   a fixed post being fixed to the pole base, and having a first fastening unit of a predetermined length at a first end thereof;
   a coil spring inserted into a second end of the fixed post;
   a flange type ring movably supported by the fixed post to be positioned on the coil spring;
   a cylindrical guide pipe inserted into the fixed post to have a smaller outer diameter than the ring, to support the flange member at an end thereof; and
   a movable post having a second fastening unit fastened to the first fastening unit of the fixed post through the end of the guide pipe, and to prevent separation of the guide pipe and the flange unit, wherein a position of the ring, the guide pipe, the flange member and the movable post are controlled according to a fastening state of the movable post and the fixed post.

4. The device according to claim 3, wherein one of the first and second fastening units is a bolt and the other one is a nut, which are thereby tightened by mutual rotation.

5. The device according to claim 3, further comprising:
   a third fastening unit having a reduced outer diameter, and disposed at the end of the guide pipe so that the flange member is inserted thereinto.

6. The device according to claim 3, further comprising:
   a physical position fixing unit to constantly maintain a position of the flange member when the flange member is moved with the guide pipe.

7. The device according to claim 6, wherein the physical position fixing unit comprises:
   a fixed pin protruding from the pole base at a predetermined distance in parallel with the guide pole; and
   a guide slit unit disposed at an end of the flange member, to guide a movement of the flange member, and to further restrict the movement thereof by using the fixed pin.

8. The device according to claim 7, wherein the fixed pin is inserted in the guide slit.

9. The device according to claim 3, wherein the movable post comprises a nut hole provided on an end thereof, to obtain a position adjusting margin of the guide pipe.

10. The device according to claim 3, wherein a position of the tape is adjusted by rotating the movable post.

* * * * *